Figure 1:
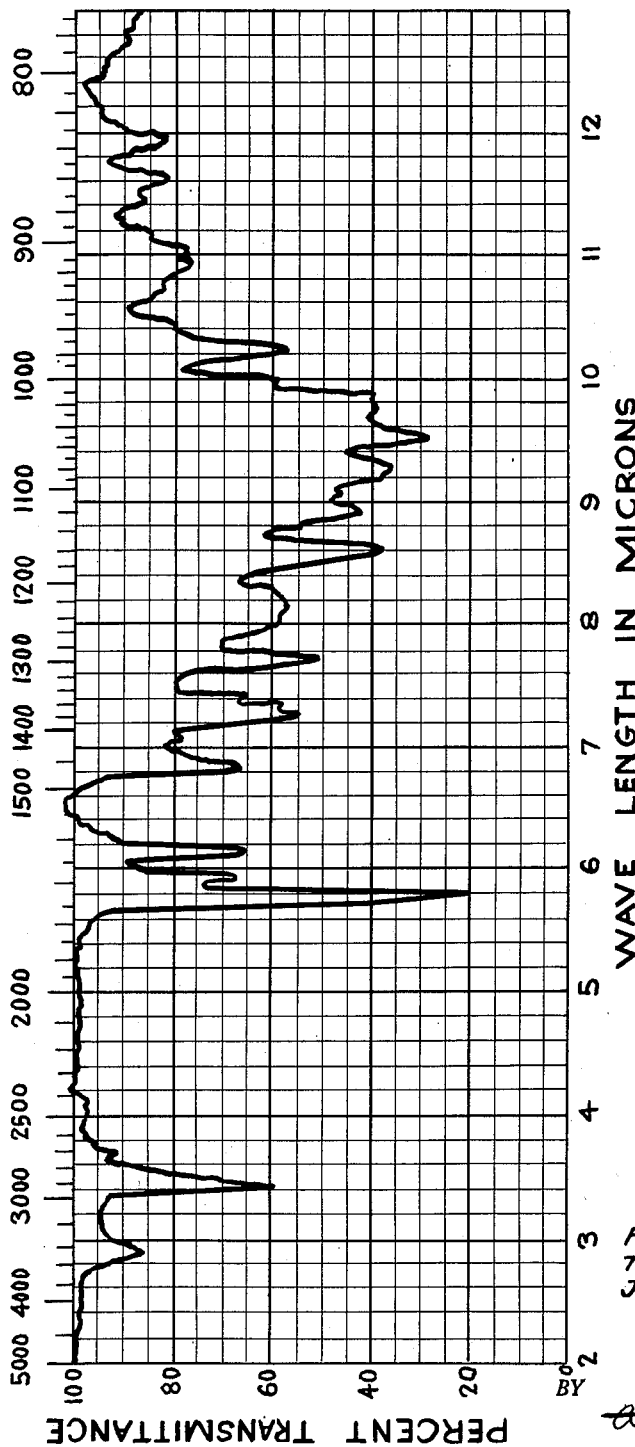

June 18, 1957  F. W. TANNER, JR., ET AL  2,796,379
CARBOMYCIN A AND ITS PRODUCTION
Filed Feb. 7, 1952  2 Sheets-Sheet 2

FRED W. TANNER, Jr.,
THOMAS M. LEES,
JOHN B. ROUTIEN
INVENTORS

BY
Connolly and Hutz
THEIR ATTORNEYS

United States Patent Office 2,796,379
Patented June 18, 1957

2,796,379

CARBOMYCIN A AND ITS PRODUCTION

Fred W. Tanner, Jr., and Thomas M. Lees, Baldwin, N. Y., and John B. Routien, Tenafly, N. J., assignors to Chas. Pfizer & Co., Inc., Brooklyn, N. Y., a corporation of Delaware Application February 7, 1952, Serial No. 270,298

8 Claims. (Cl. 167—65)

This invention is concerned with a new and useful antibiotic called Carbomycin A, and more particularly with its production by fermentation, methods for its recovery and concentration from crude solutions like fermentation broths, processes for its purification, and methods for the preparation of its salts. The invention includes within its scope the antibiotic and its salts in dilute solutions, as crude concentrates and in pure crystalline forms. These novel products are especially useful in vitro as disinfectants, and topically and internally as therapeutic agents in combatting pathogenic mycobacteria and various gram-positive microorganisms.

The new antibiotic is formed during the cultivation, under controlled conditions, of a hitherto undescribed strain of a species of microorganism known as *Streptomyces halstedii*. This new culture was planted and tested on the media normally used for the identification of actinomycetes and on the basis of the results secured, it was identified as a new strain of *Streptomyces halstedii*, using the description of the actinomycetes given in Bergey's "Manual of Determinative Bacteriology," sixth edition (1948). The characteristics of this strain differ in some respects from the description of *Streptomyces halstedii* given by Bergey. Living cultures of the new strain have been deposited with the Fermentation Division of the Northern Regional Research Laboratory at Peoria, Illinois, and have been added to its permanent collection of microorganisms as NRRL-2331.

The complete cultural characteristics of the new strain, which is hereinafter designated NRRL-2331, are given in Table I. (The colors where R is written are those of Ridgway, Color Standards and Nomenclature). Readings are based on six tubes except where otherwise noted.

The new strain of *S. halstedii*, NRRL-2331, differs from the description in Bergey's Manual in several respects. These differences are shown in the following table.

TABLE II

| Medium | Strain NRRL-2331 | Bergey's Description |
|---|---|---|
| Starch agar | Moderate growth. White aerial mycelium; poor sporulation, grayish white. | Abundant growth. Brownish, glossy growth. |
| Glucose agar | Edge lichenoid, remaining white. | Edge of colony lichenoid, becoming brown. |
| Potato plug | Growth poor to moderate, with white aerial mycelium, no spores. | Growth abundant. Growth moist, wrinklee, cream-colored with green tinge. |
| Synthetic agar | Spirals present, though not numerous. | No spirals. |

It is to be understood that for the production of carbomycin A the present invention is not limited to this particular organism or to organisms fully answering the above description, which is given for illustrative purposes. In fact, it is especially desired and intended to include the use of mutants produced from the described organism by agents such as X-radiation, ultraviolet radiation, nitrogen mustards, and the like.

Antibiotic carbomycin A shows high activity against a number of microorganisms. As previously mentioned, it is particularly noteworthy in its action on mycobacteria and gram positive microorganisms. It demonstrates some activity against gram negative microorganisms, but this is of a somewhat lower level. The following table gives the antibiotic spectrum of carbomycin A against a variety of gram negative and gram positive microorganisms. These tests were run by seeding nutrient broth containing various

TABLE I
*Streptomyces halstedii*, NRRL-2331

| Growth | Amount of Growth | Color | | Remarks |
|---|---|---|---|---|
| | | Aerial Mycelium and Sporulation | Soluble Pigment | |
| Glucose Asparagine | Moderate | Good sporulation. Mouse Gray (R) to Dark Olive Gray (R); some sectors of white aerial mycelium. | None | Edge of colony smooth, colony slightly elevated; reverse white to very light brown; spores gram-positive rods measuring 2.27 x 1.95μ. Some loose spirals; single chains curved at end. Dilution plates: Colonies alike except for varying degrees of color from Olive Gray (R) to Dark Olive Gray (R). |
| Glucose agar | do | White aerial mycelium; no spores; edge lichenoid. | do | Colony wrinkled. Reverse creamy white. |
| Nutrient agar | Poor to moderate | White aerial mycelium; some white sporulation around edge of colony; some waxy colonies. | do | Reverse creamy white. |
| Potato plugs | do | White aerial mycelium, no sporulation. | Light grayish brown. | |
| Calcium malate | do | Good sporulation, Deep Mouse Gray (R); spreading colonies. | None | Reverse creamy white. |
| Starch plates | Moderate | White aerial mycelium, poor sporulation, grayish white. | do | Reverse white; poor hydrolysis. |
| Synthetic agar | Good | Good sporulation. Mouse Gray (R) to Deep Mouse Gray (R). | do | Reverse dark gray to light gray; spirals present, not numerous. |
| Cellulose | Poor | | | |
| Emerson | Good | On some parts of tube no sporulation, white aerial mycelium; on other parts Mouse Gray (R) sporulation. | None | Reverse creamy white. |
| Dextrose Nitrate Broth | Moderate | | | Nitrates reduced. |
| Gelatin (21° C.) | Good | White aerial mycelium; no sporulation. | None | Poor liquefaction. Reverse white. |
| Skimmed Milk (15 days) | Moderate | | do | Milk coagulated in 2 tubes; Milk unchanged in 2 tubes. No peptonization. Proteolysis very weak. | concentrations of the pure antibiotic with the particular organism. The figures in the column marked "growth" indicate the highest concentration tested (in micrograms/milliliter) at which growth of the microorganism still occurred. The second column, "no growth," shows the minimum concentration used at which no growth of the microorganism occurred. The test was conducted under standardized conditions, the tubes being incubated for a standardized time.

TABLE III

|  | Growth, mcg./ml. | No Growth, mcg./ml. |
|---|---|---|
| Strep. faecalis |  | <.19 |
| Brucella bronchiseptica | 6.25 | 12.5 |
| A. aerogenes 2 | 50 | 100 |
| E. coli 21 | 100 |  |
| Proteus Sp. 1 | 50 | 100 |
| Ps. aeruginosa 173 | 50 | 100 |
| M. albicans 8 | 100 |  |
| E. typhosa 344 | 50 | 100 |
| K. pneumoniae 132 | 50 | 100 |
| S. paratyphi A 134 | 50 | 100 |
| S. paratyphi B 139 | 50 | 100 |
| Micrococcus pyogenes var. aureus 5 | 0.19 | 0.39 |
| B. subtilis 219 | 0.39 | 0.78 |

In addition to the above microorganisms, certain resistant strains were used in order to determine the activity of the new antibiotic. For instance, using an aureomycin and chloramphenicol resistant strain of *A. aerogenes*, it was found that growth occurred at a concentration of 25 micrograms of carbomycin A per milliliter of nutrient broth, but that no growth occurred at a concentration of 50 micrograms/milliliter. In a second test of this nature, a strain of *A. aerogenes* resistant to both streptomycin and streptothricin was also found to grow in the presence of 25 mcg. of carbomycin A per ml. but it did not grow at a concentration of 50 mcg./ml. In addition to showing the effectiveness of the new antibiotic against such resistant strains, this test also demonstrated that the antibiotic definitely differs from aureomycin, chloramphenicol, streptothricin, and streptomycin. It will also be noted that antibiotic carbomycin A is even more active against antibiotic-resistant strains of *A. aerogenes* than it is against the normal strain of *A. aerogenes*, as indicated in the above Table III. A strain of *Staphylococcus aureus* was found to be resistant in vitro to the action of penicillin at a concentration of 100 units/ml.; dihydrostreptomycin at 100 units/ml.; polymyxin at 100 units/ml.; and sensitive to the action of chloramphenicol at 100 mcg./ml. and aureomycin at 12.5 mcg./ml. This organism was inhibited by a concentration of 3.1 mcg./ml. of carbomycin A.

Antibiotic carbomycin A has been shown to be highly effective against a variety of types of mycobacteria. In the following table are given the results of such tests. In this case tubes of Dubos liquid medium, containing 0.5% albumin, were used as the test medium. Antibiotic carbomycin A was added to the medium at various levels as indicated in the first column of the following table. Tubes of the medium containing various concentrations of the antibiotic, as indicated, were then seeded with cultures of the various mycobacteria. The identity of the species is indicated at the head of each of the columns in the table. Under the name of the species are indicated the results of the test. It was conducted by incubating the tubes under sterile conditions for 18 hours. Lack of growth in the tubes at the end of the standard test period is indicated by a minus (−) sign, doubtful growth is indicated by ± and growth is indicated by +.

TABLE IV

*Activity of carbomycin A against mycobacteria*

| mcg./ml. | ranae | phlei | smegmatis | 607 | berolinense | butyricum |
|---|---|---|---|---|---|---|
| 12.5 | − | − | − | − | − | − |
| 6.25 | − | − | − | − | − | − |
| 3.12 | ± | − | − | − | − | − |
| 1.56 | + | − | − | − | − | − |
| .78 | + | ± | − | ± | − | ± |
| .39 | + | + | − | ± | ± | ± |
| .19 | + | + | ± | + | ± | + |

It will be seen from the above table that carbomycin A displays an unusual degree of activity against these mycobacteria.

Antibiotic carbomycin A has been found to possess a relatively low level of toxicity when used in test animals. For instance, the $LD_0$ value, when the antibiotic is administered intravenously to mice, as a solution in acidified water is approximately 7 mg./20-gram per mouse. Toxicity to other species and by other routes of administration is comparable.

This invention includes, within its scope, a process for growing the hitherto undescribed strain of *S. halstedii*. The cultivation of the microorganism preferably takes place in aqueous nutrient media at a temperature of about 24°–30° C., and under submerged conditions of agitation and aeration. Nutrient media which are useful for this process include a carbohydrate, such as sugars, starch, glycerol, corn meal, and a source of organic nitrogen, such as casein, soybean meal, peanut meal, wheat gluten, cottonseed meal, lactalbumin, enzymatic digest of casein, tryptone. A source of growth substances, such as distillers' solubles, yeast extract, molasses fermentation residues, as well as mineral salts, such as sodium chloride, potassium phosphate, sodium nitrate, magnesium sulfate and trace minerals such as copper, zinc and iron may also be utilized with desirable results. If excessive foaming is encountered during the fermentation, anti-foaming agents, such as vegetable oils, may be added to the fermentation medium. The pH of the fermentation tends to remain rather constant, but, if variations are encountered, a buffering agent, such as calcium carbonate may also be added to the medium.

Inoculum for the preparation of antibiotic carbomycin A by the growth of the new strain of *S. halstedii* may be obtained by employing growth from slants on such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about two to three days. However, variations in the equipment used, the rate of aeration, rate of stirring and so forth may effect the speed with which the maximum activity is reached. In general, from about 24 hours to four days is a desirable period for producing the antibiotic. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must, of colurse, be maintained throughout the transfer of the inoculum and throughout the growth of the microorganism.

After growth of the microorganism, the mycelium, which is generally quite luxuriant and fine, may be removed from the fermentation broth by various standard equipment, such as filter-presses, centrifuges, and so forth. It has been found that reducing the pH of the whole fermentation broth to about 3.0 assists in the filtration. Since the antibiotic is not highly stable under acid conditions, the fermentation broth should be adjusted to approximately neutrality once it has been filtered. The carbomycin A may be recovered from fermentation broth by several different procedures. Alternatively, the whole broth may be used as is or it may be dried. The antibiotic may be further purified by various means; for instance, the compound may be extracted from aqueous solution at neutral or slightly alkaline pH's, preferably between about 6 and about 10, by means of a variety of water-immiscible organic solvents, including ethers, aromatic hydrocarbons, esters, ketones, lower alcohols and halogenated hydrocarbons. Examples of these are diethyl ether, benzene, toluene, ethyl acetate, butyl acetate, methyl isobutyl ketone, butanol, and chloroform. Even at acidic pH's some of these solvents extract an appreciable amount of antibiotic. This is particularly true of the water-immiscible alcohols, such as butanol, pentanols, and so forth. The antibiotic may be extracted from most solvent solutions back into acidified water, preferably at a pH of below about 2.5. If desired, the solvent extract may be concentrated before extraction into acidified water. By adjustment of the pH to neutrality or alkalinity, the antibiotic may be re-extracted into one of the solvents indicated above. Upon drying the solvent and concentrating the solution the antibiotic crystallizes. It generally crystallizes as white, blunt needle crystals. However, in some cases a plate-like form of the crystals is obtained. The product may be recrystallized from benzene, ether, lower ketones, or lower alcohols. If desired, a solution in one of the water-miscible alcohols or ketones is concentrated and water is added to assist the crystallization. Alternatively, the antibiotic may be recovered by adsorption from broth or concentrates on activated carbon. Elution with acid or with water and a water-miscible solvent containing acid removes the compound in a purified form.

Carbomycin A is a weakly basic, white, organic compound that is soluble in dilute aqueous acids, but only slightly soluble in water (approximately 0.5 mg./ml.). It is extremely soluble in a number of organic solvents, such as acetone, ether, benzene and chloroform, and is somewhat less soluble in methanol and ethanol. It is insoluble in hexane. On concentrating a solvent solution of carbomycin A, there is a tendency to form super-saturated solutions, and the crystals which form tend to retain some of the solvent used. The compound has decreased stability in strongly acid and in basic solutions, even at room temperature. It is quite unstable on heating in acid solutions and on heating in alkaline solutions, and shows its maximum stability in a pH range of from 3 to 7. Its stability in the dry state or dissolved in dry solvents is good.

Highly purified, crystalline carbomycin A base, such as is attained by recrystallization from lower alcohols, ether, benzene and like solvents, tends to occur in the form of solvated crystals from which the solvent may be removed more or less completely by prolonged drying at 100° C. Such dried material has a melting point of 217–218° C. with slight decomposition (determined by inserting the sample in the melting point bath at 196° C. and raising the bath temperature at a rate of 3.6° per minute). The crystalline anhydrous material forms a monohydrate when exposed to atmospheric moisture. The anhydrous crystalline base contains the elements carbon, hydrogen, nitrogen and oxygen in the following proportions by weight:

| | Percent |
|---|---|
| Carbon | 59.8 |
| Hydrogen | 8.2 |
| Nitrogen | 1.7 |
| Oxygen (by difference) | 30.3 |

The material has an optical rotation of $[\alpha]_D = -58.6°$ (in dilute chloroform solutions). It was found to have a pKa value of 6.4 by conventional titration and a molecular weight of approximately 866. The ultra-violet absorption spectrum of the pure base possesses a definite peak at 242 m$\mu$ (10 mg. in 250 ml. of 0.1 N-hydrochloric acid). The anhydrous crystalline base, when dissolved in chloroform, shows a number of characteristic peaks in the infra-red region. Among these are the following frequencies (in reciprocal centimeters): 3510, 2920, 1732, 1690, 1630, 1460, 1375, 1300, 1230, 1160, 1122, 1077, 1052, 1025, 1015, 976, 916, 910, 873, 860 and 837. An infra-red spectrum of such a chloroform solution is shown in Fig. 1 of the attached drawings.

Salts of carbomycin A with acids may be prepared by treatment of the base with the appropriate acid. For instance, if the base is dissolved in ether and a stream of hydrogen chloride is bubbled into the solution, carbomycin A hydrochloride immediately precipitates. Other acids may be used in the same or similar processes to make other acid salts of carbomycin A. However, as pointed out above, carbomycin A is not highly stable in aqueous acid solutions, so care must be exercised.

A number of different microorganisms may be used to determine the potency of carbomycin A preparations. These include *K. pneumoniae*, *B. subtilis*, *Staph. aureus*, and other standard test organisms. When *K. pneumoniae* is used, it may be in the form of a turbidimetric test or a plate assay. Crystalline chloramphenicol may be used as a standard, assigning a value of 1000 units/mg. to this antibiotic. On this basis, crystalline carbomycin A has a potency of 750 to 850 chloramphenicol units per mg. In the preparation of carbomycin A by fermentation, broths having a potency of about 15 to about 100 units/ml. are obtained.

Carbomycin A has been distinguished from other antibiotics by its properties. The properties that have been used for this comparison include those listed above, as well as measurements by means of paper chromatography, which show a distinct difference. Comparisons have also been made with microorganisms resistant to various other antibiotics.

The following examples are given by way of illustration and are not to be considered as the only manner in which this invention may be embodied. It is to be understood that protection hereof is only to be limited by the specific wording of the appended claims.

EXAMPLE I

Spores of an Emerson agar slant of *S. halstedii* NRRL–2331 were transferred under aseptic conditions to a nutrient medium having the following composition:

| | Grams |
|---|---|
| Cerelose | 10 |
| Soybean meal | 10 |
| Sodium chloride | 5 |
| Distillers' solubles | 5 |
| Calcium carbonate | 1 |

This mixture was diluted to one liter and adjusted to pH 7 with potassium hydroxide before sterilizing. After the medium had cooled, the spores were added. The organism was grown in shaken flasks for two days at about 28° C. The broth containing the mycelium was then transferred to twenty times its volume of a sterile medium of the following composition:

| | Grams |
|---|---|
| Starch | 20 |
| Casein | 10 |
| Soybean meal | 15 |
| Calcium carbonate | 1 |

Figure 2:
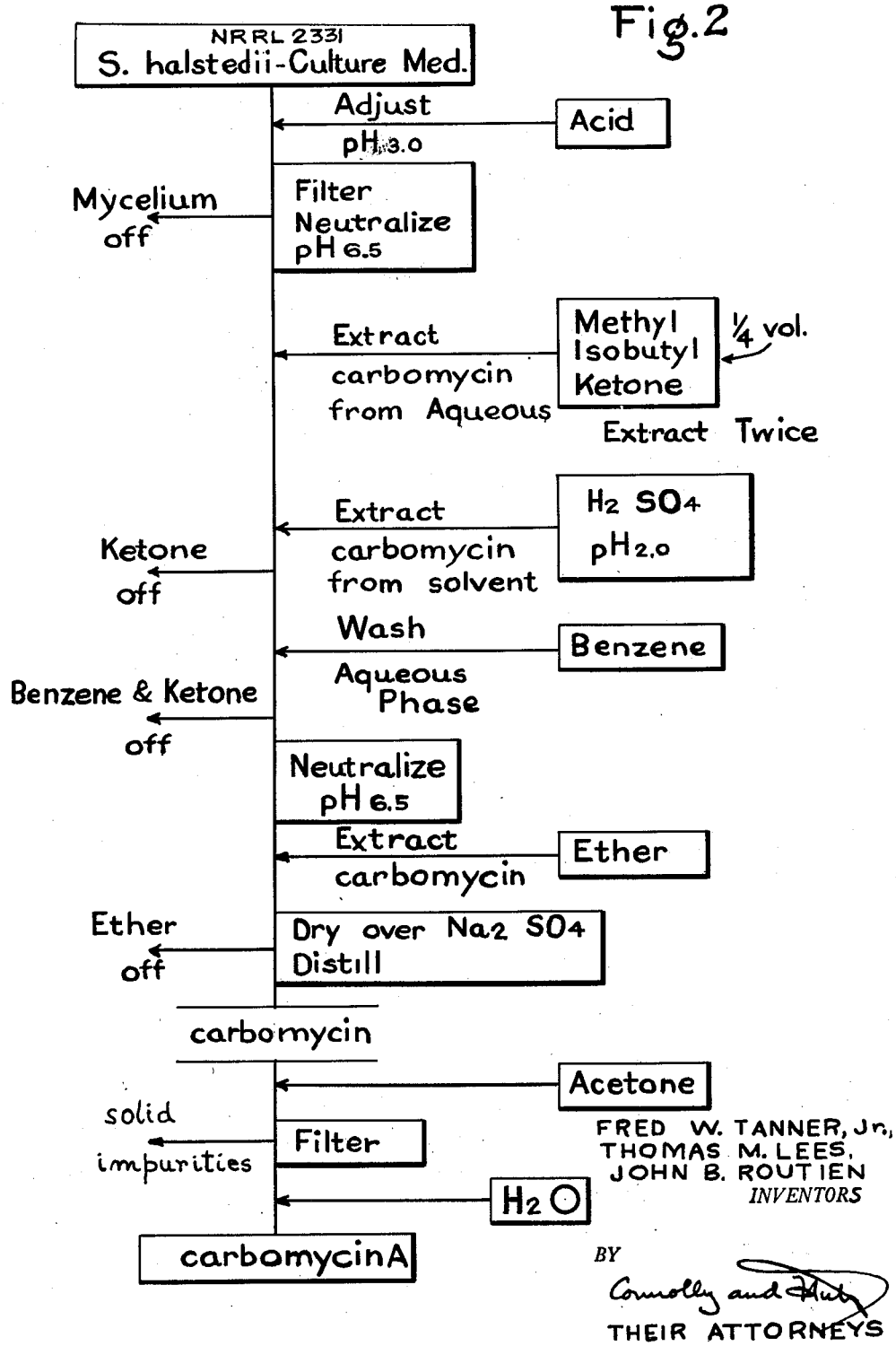

This mixture was diluted to one liter and adjusted to pH 7 before autoclaving and seeding. After agitation and aeration under sterile conditions for two days, the potency of the broth was found to be 100 units/ml. The mixture was adjusted to pH 3.0 and the mycelium was removed by filtration. The filtrate was adjusted to pH 6.5, and it was then extracted twice with one-quarter volume of methyl isobutyl ketone. The combined solvent phases were concentrated to one-tenth volume under vacuum. The antibiotic was then extracted into water at a pH of about 2.0, using sulfuric acid to adjust the pH. The aqueous phase was separated, washed with a small volume of benzene to remove dissolved methyl isobutyl ketone, and the aqueous phase was adjusted to pH 6.5. The antibiotic was extracted several times with ether and the separate ether phases were dried over anhydrous sodium sulfate. The solvent was removed by distillation and the antibiotic crystallized as white needles. The product was recrystallized by dissolving it in acetone, filtering to remove solid impurities, concentrating, and adding water. A flow sheet illustrating the above extraction process is shown in Fig. 2. The product obtained was found highly effective against a variety of mycobacteria and gram positive microorganisms.

EXAMPLE II

A medium was prepared having the following composition:

| | Grams |
|---|---|
| Starch | 20 |
| Distillers' solubles | 10 |
| Soybean meal | 15 |

The mixture of materials was added to one liter of water and the pH was adjusted to 7 before the addition of one gram of calcium carbonate. The medium was then autoclaved and seeded with S. halstedii NRRL-2331 inoculum under sterile conditions. The mixture was subjected to aeration and agitation under sterile conditions at about 28° C. for two days. The filtered broth assayed 25 units of carbomycin A per milliliter of solution.

What is claimed is:

1. A process for producing carbomycin A, which comprises cultivating Streptomyces halstedii NRRL-2331 in an aqueous nutrient medium under submerged aerobic conditions until substantial antibacterial activity is imparted to said medium.

2. A process as claimed in claim 1 wherein the carbomycin A is recovered from the fermentation broth.

3. A process for producing carbomycin A, which comprises cultivating Streptomyces halstedii NRRL-2331 in an aqueous nutrient medium under agitated, submerged aerobic conditions at a temperature of from about 24° to about 30° C. for a period of from about one day to about four days.

4. A process as claimed in claim 1 wherein carbomycin A is recovered from the fermentation broth by filtering the broth and solvent extracting it at a pH between about 6 and about 10.

5. A substance effective inhibiting the growth of gram-positive bacteria and mycobacteria, selected from the group consisting of a basic substance slightly soluble in water, very soluble in acetone, ether, benzene and chloroform, and capable of forming salts with acids; whose anhydrous crystalline base (a) contains the elements carbon, hydrogen, nitrogen and oxygen in the following proportions by weight:

| | Percent |
|---|---|
| Carbon | 59.8 |
| Hydrogen | 8.2 |
| Nitrogen | 1.7 |
| Oxygen (by difference) | 30.3 |

(b) has an optical rotation of $[\alpha]_D = -58.6°$ (in dilute chloroform solutions), (c) possess an ultra-violet absorption spectrum showing a definite peak at 242 m$\mu$ (in dilute HCl), and (d), when dissolved in chloroform, exhibits characteristic absorption peaks in the infra-red region at the following frequencies expressed in reciprocal centimeters: 3510, 2920, 1732, 1690, 1630, 1460, 1375, 1300, 1230, 1160, 1122, 1077, 1052, 1025, 1015, 976, 916, 910, 873, 860 and 837; and the acid salts of said basic substance.

6. The basic substance defined in claim 5.

7. An acid salt of the basic substance defined in claim 5.

8. A hydrochloride of the basic substance defined in claim 5.

References Cited in the file of this patent

UNITED STATES PATENTS 2,516,080  Sobin et al. _____ July 18, 1950

OTHER REFERENCES

Gardner et al.: Brit. J. Exptl. Path., 1942, vol. 23, pp. 123 to 127.

Kocholaty et al.: J. Biol. Chem., May 1947, pp. 765–769.

Waksman: "The Actinomycetes," pub. 1950, pp. 116–119.